United States Patent
Hannu et al.

(10) Patent No.: US 7,428,422 B2
(45) Date of Patent: Sep. 23, 2008

(54) METHOD AND SYSTEM FOR SETTING APPLICATION SETTINGS FOR A PUSH-TO-TALK SERVICE

(75) Inventors: Hans Hannu, Luleå (SE); Krister Svanbro, Luleå (SE); Mats Nordberg, Luleå (SE); Per Synnergren, Luleå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 401 days.

(21) Appl. No.: 10/545,278

(22) PCT Filed: Feb. 24, 2004

(86) PCT No.: PCT/SE2004/000242

§ 371 (c)(1),
(2), (4) Date: Aug. 11, 2005

(87) PCT Pub. No.: WO2004/075581

PCT Pub. Date: Sep. 2, 2004

(65) Prior Publication Data

US 2006/0094455 A1 May 4, 2006

(30) Foreign Application Priority Data

Feb. 24, 2003 (SE) .................................... 0300555

(51) Int. Cl.
*H04B 7/00* (2006.01)
(52) U.S. Cl. ................ 455/518; 455/90.2; 455/519; 455/520; 455/412.1; 455/414.1
(58) Field of Classification Search .............. 455/412.1, 455/414.1, 518–520, 90.2; 370/352, 389, 370/338, 328, 353, 276
See application file for complete search history.

(56) References Cited

U.S. PATENT DOCUMENTS

| 6,360,093 | B1 * | 3/2002 | Ross et al. ............... 455/414.1 |
| 6,865,398 | B2 * | 3/2005 | Mangal et al. ........... 455/552.1 |
| 7,221,959 | B2 * | 5/2007 | Lindqvist et al. ......... 455/552.1 |
| 7,260,414 | B2 * | 8/2007 | Hassan et al. ............... 455/518 |

(Continued)

FOREIGN PATENT DOCUMENTS

| EP | 0876072 A2 | 11/1998 |
| WO | WO 0137526 A1 | 5/2001 |

OTHER PUBLICATIONS

Swedish Patent Office, International Search Report for PCT/SE2004/000242, dated Apr. 20, 2004.

*Primary Examiner*—Matthew Anderson
*Assistant Examiner*—Dominic E Rego
(74) *Attorney, Agent, or Firm*—Roger S. Burleigh

(57) ABSTRACT

A Multimedia system and a method in a Multimedia system where a first user with user equipment (1) uses a Push to talk service (PTT) to communicate with at least one second subscriber's user equipment (2) using said Push to talk service (PTT), wherein a PTT-server (3) providing the PTT-service interacts with said first and second subscriber's user equipment (1, 2) and exchanges information concerning relevant parameter values for each user equipment (1, 2), and each user equipment (1, 2) adapting its application settings during the operation of said PTT-service, whereby degradation of the perceived quality is prevented

18 Claims, 5 Drawing Sheets

U.S. PATENT DOCUMENTS

2004/0196826 A1* 10/2004 Bao et al. .................. 370/352
2004/0203907 A1* 10/2004 Hiller et al. .............. 455/456.1
2004/0224710 A1* 11/2004 Koskelainen et al. ........ 455/518
2007/0047515 A1* 3/2007 Jonsson et al. .............. 370/352

* cited by examiner

METHOD AND SYSTEM FOR SETTING APPLICATION SETTINGS FOR A PUSH-TO-TALK SERVICE

TECHNICAL FIELD

The present invention relates to a multimedia system where a first user equipment uses a Push to talk service (PTT) to communicate with at least a second user equipment using said Push to talk service (PTT).

BACKGROUND

Many telecommunications operators want to have common infrastructure for new service introduction. The so called IP Multimedia System (IMS) is a technology standardized by 3GPP. It adds the ability to deliver integrated voice and data services over the IP-based packet switched network.

The IP Multimedia System (IMS) enables a 3G system being specified by 3GPP to both benefit from the use of Internet Protocols (IPs) and offers capabilities that IP is designed to provide. These include access to Internet and multimedia content. IP offers a number of attractions over traditional telecommunications protocols: in addition to representing a bridge between the telecommunications and Internet worlds, it also offers a "seamlessness" of communication over many different types of networks. As a result, customers will experience extremely flexible telecommunications, irrespective of the various networks over which their calls may pass.

One type of service that can be even more valuable for operators and their customers is the Push-to-talk (PTT) service implemented in IMS.

Push-to-talk (PTT) is basically a "walkie-talkie" in a cellular telecommunication system. Push-to-talk systems are typically used in settings where a group of geographically diverse people require communications with each other in a "point-to-multipoint" fashion. Examples of push-to-talk system uses include workgroup communications, security communications, construction site communication, and localized military communications. The new service PTT providing group communication services is applicable to both real-time data, such as audio and video data (including voice data), and time-independent data, such as computer files, email, and so on.

Earlier known system is Land Mobile Radios, which have been used in trucks, taxis, buses, and other vehicles in order to communicate scheduling information between a central dispatch centre and one or more corresponding fleet vehicles. Communications may be directed at a specific vehicle in the fleet or to all vehicles simultaneously. These solutions are based on different technology. Another known solution based on cellular technology is the solution that the US operator Nextel has sold as a proprietary PTT-solution. This solution is called Direct Connect and is based on Motorola's iDEN (integrated Digital Enhanced Network) technology. A drawback with this solution is that their versions of the special connection calls require that all members are located in the same area served by one BSC (Base Station Controller). Another drawback is that it is not based on any standard protocols, such as RTP, and thus suffers from bandwidth problems.

WO 01/37526 discloses a general method and an apparatus for providing push to talk functionality to a conventional wireless phone. Basically, the document discloses providing an input mechanism or button that functions as a conventional telephone function while the telephone is used in conventional telephone mode, and that functions as a push to talk function while the telephone is in a push to talk mode. The document does not disclose how the telephone interacts with either a PTT-server or another telephone.

EP 0 876 072 discloses a scalable radio platform for wireless communication system which can interface with user equipment or system equipment to allow system parameters to be modified such that users of different communication systems can communicate with each other, and also allows a wireless communication system to adapt to changing radio conditions. However, the document does not disclose any pointers as to how the quality of a PTT-session between two or more subscribers with user equipment can be improved or prevented from degrading.

SUMMARY

A general object of the present invention is to provide an improved Push-to talk service in a multimedia system.

A further object of the present invention is to provide a solution for preventing degradation of the user-perceived quality for a Push to talk (PTT) service in a multimedia system.

Another object is to provide a solution for a more efficient utilization of available bandwidth to a PTT-service in a multimedia system.

Yet, another object of the present invention is to set the appropriate application settings of the PTT-service with respect to the system characteristics (such as the radio environment, and available mechanism in the PTT-system, e.g. header compression).

The invention is based on the recognition that during a Push to talk session involving at least two user equipment, and a Push to talk server providing the service, the quality of the radio link is typically different from one user equipment to another. As a consequence, when a first user equipment initiates and transmits speech over one radio link with a specific quality and a second user equipment receives the speech over another radio link with its specific quality, unwanted delay can be introduced. Also other undesirable effects may be introduced, including loss of speech data packets, whereby the overall quality of the session is degraded.

In order to achieve the above mentioned objects, a general embodiment according to the invention is provided in a Multimedia system where a first user equipment uses a Push to talk service (PTT) to communicate with at least one second user equipment using said Push to talk service (PTT). Furthermore, a PTT-server interacts with the first and second user equipment, information for adaptation of user equipment application settings is exchanged between the equipment and the PTT-server during the interaction, finally the application settings are adapted during operation of the PTT-service.

Another general embodiment of the invention comprises that at least one of a first and a second user equipment report its PTT session parameter values for PTT application settings in said user equipment to the PTT-server. New PTT session parameter values are determined based on said reported PTT session parameter values and at least one of said first and second user equipment adapting its PTT application settings during session operation of said service.

According to a more specific embodiment of the invention, at least one of the first and second user equipment determines their respective relevant parameter values for the application service and reports these to the PTT-server. Based on the reported parameters the PTT-server suggests or communicates suitable new parameter values or application settings to the user equipment. Finally, the equipments adapt their respective parameter values according to the information from the PTT-server.

In a further embodiment, the PTT-server communicates the received parameter values to at least one of the first and second user equipment. The user equipment then generates new parameter values based on received values and possibly on its own old parameter values. An updating or adaptation of the PTT application settings is then performed in the user equipment using the generated parameter values.

According to a more specific exemplification of an embodiment according to the invention in a Multimedia system where a first user equipment uses a Push to talk service (PTT) to communicate with at least one second subscriber's user equipment using said Push to talk service (PTT), where:

at least one of said first and second subscriber equipment signal the determined parameters values to said PTT-server and/or to other of said first and second equipment which do not have said parameters values, and said PTT-server collects the determined parameter values from said first and second user equipment and provides information of suitable application settings for all of said first and second user equipment.

In addition, said signalling is performed using on or several of the following methods: SIP/SDP, In-band channel, RTP, RTPC, specific radio protocol.

According to a possible embodiment according to the invention, said second user equipment are a plurality of user equipment and several of said plurality of user equipment have high bandwidth links and one or a few of said second user equipment have poor radio environment and the said PTT-server can chose to:

a) order all of first and second subscriber equipment to use a robust settings (all subscriber have the same settings as the one with the lowest link quality);

b) perform adjustment to the transmitted data in said PTT-server for the user which has the lowest quality; and/or c) drop the user with the lowest quality.

The adaptation of the application settings can be performed according to received information according to the following:

a) number of frames in an IP-packet are adopted in-between two talk spurts either when a special button on subscriber equipment are released or during silence periods in the speech (detected by a voice activity detection algorithm);

b) coder mode may be adopted during speech;

c) frame buffer depth are adopted in-between two talk spurts either when a special button on subscriber equipment are released or during silence periods in the speech (detected by a voice activity detection algorithm); and/or d) other relevant parameters will be adopted in periods where they not disturb the system quality.

According to the invention a Multimedia system is provided where a first user equipment uses a Push to talk service (PTT), with specific application settings, to communicate with one or several second subscriber's equipment using said Push to talk service (PTT) and where degrading of the perceived quality is prevented. The PTT-server interacts with said first and second user equipment while said application settings are changed during the operation of said service, and said first and second user equipment and PTT-server exchange information for adaptation of said application settings.

Also, a PTT-server and a user equipment are provided according to the invention.

Advantages of the present invention are:
An improved utilization of available bandwidth.
Prevention of degradation of perceived quality.
Reduction of delay during a session.

Other advantages offered by the invention will be appreciated upon reading of the below description of the embodiments of the invention.

The main advantage of the invention is that the invention makes it possible to create a better infrastructure for operators which subscribers can benefit from and further creating a system with, in average, lower delay and higher perceived quality of service.

BRIEF DESCRIPTION OF THE DRAWINGS

The invention, together with further objects and advantages thereof, may best be understood by making reference to the following description taken together with the accompanying drawings, in which.

DETAILED DESCRIPTION

A glossary of the abbreviations used in this detailed description of the invention is set out below to facilitate an understanding of the present invention.

| | |
|---|---|
| CDMA | Code Division Multiple Access |
| RTCP | Real Time Control Protocol |
| SIP | Session Initiated Protocol |
| SDP | Session Description Protocol |
| BLER | Block Error Rate |
| AMR | Adaptive Multi Rate |
| IPv6 | Internet Protocol version 6 |
| WCDMA | Wideband Code Division Multiple Access |
| GSM | Global System for Mobile communication |
| EGPRS | Enhanced GPRS |
| GPRS | General Packet Radio Services |
| UDP | User Datagram Protocol |
| RTP | Real Time Protocol |
| IP | Internet Protocol |
| PTT | Push-to-talk |

For at better understanding of the invention, it may be useful to begin with a brief system overview and analysis of the problem.

The system in which the invention is implemented is an IP Multimedia Subsystem (IMS) as specified by 3GPP for enabling IP connections between mobile phones.

Figure 1:
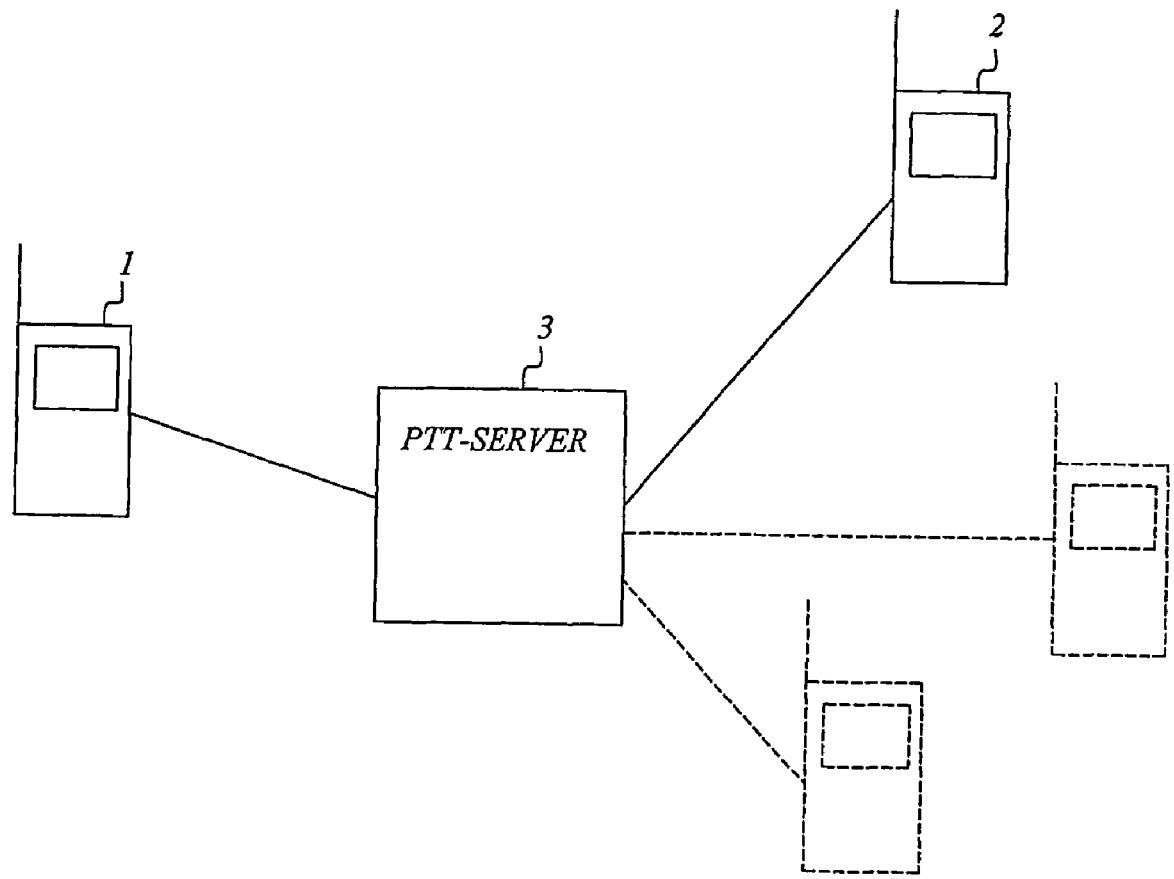
FIG. 1 is a schematic overview of a multimedia system.

Basically, a Push to talk service (PTT) between a first subscriber's user equipment 1 and at least a second subscriber's user equipment 2 is provided by a PTT-server 3, as is illustrated in FIG. 1.

The task of the PTT server 1 is to handle multimedia conferencing between two or more end-points in a packet switched network and mix the data streams, which belongs to the same conference. Conferences or sessions are set up with the PTT server 3 as a centralised conference bridge, mixing the different media streams and interact with user equipment 1, 2.

The PTT-service relies on a dedicated channel, over which communications are received by the wireless telephones. Only one member or user equipment 1, 2 may transmit information to the other members or user equipments at a time. However, all members can listen to the dedicated broadcast channel to receive communications from the single member who is transmitting. Subscribers desiring to transmit to other members of the system typically send an access request by depressing a push-to-talc button on a respective communication device, which allows sole access to the dedicated transmission channel. The dedicated channel is sometimes referred to as a broadcast channel.

There are typically two different types of PTT-sessions, so called one-to-one and one-to-many, as indicated in FIG. 1.

For the case of a one-to-one session between two mobile telephone subscribers, e.g., A and B. When A wishes to have communication with B, A enters B's private identification number, holds down a push to talk ("PTT") button on the user equipment 1, waits for an audible alert signifying that B is ready to receive, and starts speaking. To listen, A releases the PTT button. If B wishes to speak, B holds down the PTT button on its user equipment 2 and waits for an audible confirmation that A is ready to receive.

For the case of one-to-many, a pre-defined group of subscribers is identified by a number. In order for a subscriber to place a group call, the initiating subscriber, e.g., A, locates a group number in the user equipment 1, holds down the PTT button, and, upon receiving an audible confirmation such as a peep, can start speaking. All of the other group members on the group call can only listen while A is holding down the PTT button. If A releases the PTT button, another member on the group call may hold down the PTT button, acquire control signalled by the audible confirmation, and start speaking.

PTT enabled phones will most likely be equipped with a hardware or software PTT-button. When the PTT-button is pressed, the phone connects you directly to a friend, a family member or even a whole group of people of your choice. Like a "walkie-talkie", the PTT-service is simple. Thanks to the fast connection, e.g. not having to dial a number, the user can start to speak immediately after pressing the button. The PTT-service handle 1-to-1 direct calls as well as 1-to-many calls (group calls).

PTT is a packet switched application, which means that the PTT service sends the speech in IP/UDP/RTP-packets over a GPRS or EGPRS bearer in GSM-systems and over the interactive or the streaming radio bearer in the WCDMA systems. One gain with the PTT-service compared to traditional voice services in cellular systems (compared to circuit switched technologies) is that resources in the systems are only used when someone is talking even though the users have a virtual connection that may last a whole day (or more).

From a High Level Perspective, the Typical PTT Service Works According to the Following:

When the PTT-button is pressed down, a fast session initialization is performed. Basically, the transmitting user equipment 1 sends a SIP message to a PTT-server 3 in order to invite the other user(s) 2 to a session. When the PTT-server 3 has responded with an OK, the handset 1 starts to transmit coded speech in IP/UDP/RTP-packets.

Depending on the radio environment for the users involved in the session, the available bandwidth for the PTT-service will change in time (and space). Hence, the user-perceived quality might drop from an acceptable level to an unacceptable level due to large delays and/or a high rate of lost speech frames.

Therefore, to obtain as high quality of service as possible it is necessary, according to the invention, that a number of application settings can be changed during the operation of the service.

When the PTT-button is released, SIP messages signal that the session is over and every handset or user equipment in the session goes down to idle mode. Even though the handsets go down to idle, the handsets should be able to change their application settings depending on either radio environment measurements/determination or reports that are sent to the handset from the PTT-server.

The system characteristics have significant influence on available bandwidth for the PTT-service. With appropriate application settings the bandwidth is efficiently used thus optimizing the perceived quality of the service.

A general embodiment of a method according to the invention comprises that a PTT-server 3 interacts with first 1 and second 2 user equipment, information for adaptation of application settings is exchanged between the user equipment 1, 2 and the PTT-server 3 during the interaction, and finally the application settings are adapted during operation of the PTT-service.

Figure 2:
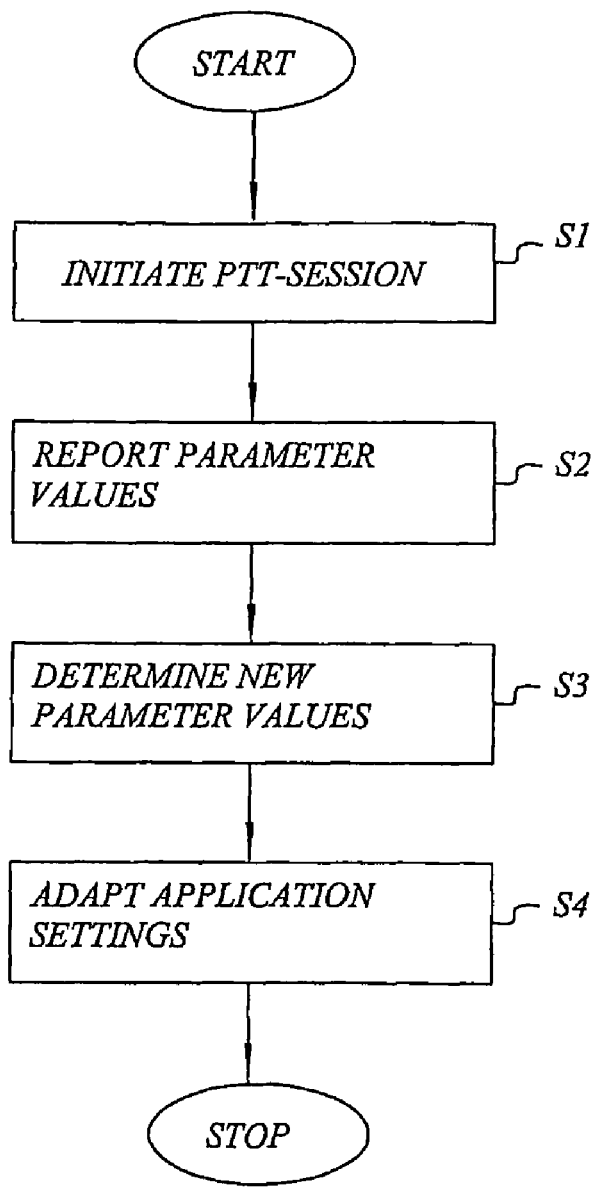
FIG. 2 is a schematic flow diagram of an embodiment of a method according to the invention.

Referring to FIG. 2, another general embodiment of a method according to the invention is illustrated. The method starts with an initiation of a PTT-session involving at least a first and a second user equipment in step S1. Thereafter at least one of a first and at least a second user equipment reports PTT session parameter values for PTT application settings in said user equipment to the PTT server in step S2. A next step S3 determines new PTT session parameter values based on said reported PTT session parameter values. Finally, at least one of said first and second user equipment adapts its PTT application settings during the operation of said PTT service in step S4.

According to another more detailed embodiment of a method according to the invention, the interaction between the PTT-server and the first and second user equipment comprises that during a PTT-session at least one of said first and second user equipment determines relevant PTT-session parameters for its PTT application settings. The user equipment reports the determined parameter values to the PTT-server. The PTT-server collects the reported parameter values and distributes the collected parameter values either raw and/or as suggested application settings in an effective manner to the each user equipment. Finally, the user equipment adapts their application settings in response to the suggestion from the PTT-server.

Figure 3:
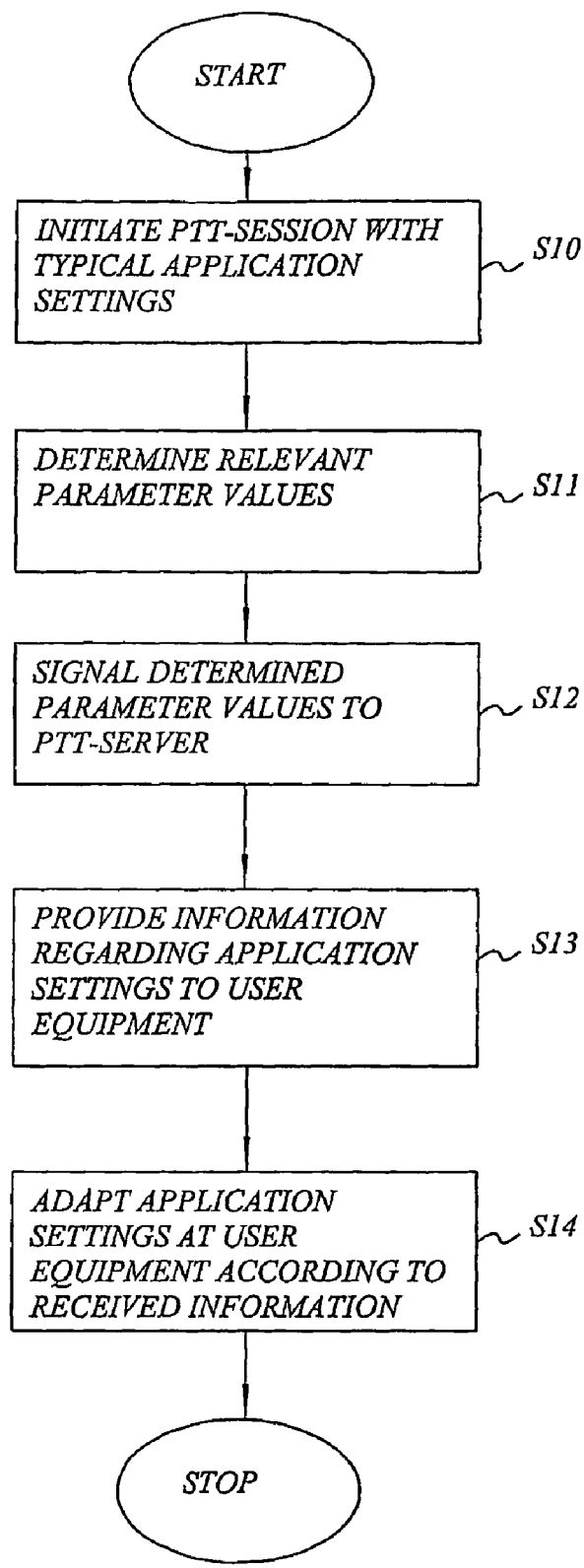
FIG. 3 is a schematic flow diagram of another embodiment of a method according to the invention.

A detailed exemplary embodiment of a method according to the invention is described below, with reference to FIG. 3.

Initially, in a first step S10, a PTT-conversation or session is set up or started by a first subscriber with user equipment according to known procedures i.e. the first subscriber pushes a PTT-button at a user equipment and awaits an acknowledgments signal. In this set up, typical application settings such as number of frames per IP packet, coder mode, frame buffer depth etc. are utilized.

In a second step S11 during the PTT-session, said first and second user equipment, measures and/or determines the relevant PTT-session parameter values for their PTT application settings according to at least one of the parameters in the following:

a) Received bit rate
b) Maximum possible bit rate
c) Coding scheme used
d) Number of time slots used
e) Header compression used or not
f) . . . other relevant PTT-session parameter values In the above mentioned step both of said first and said second user equipment determines relevant parameter values. However, it is anticipated by the invention that only one of the first and second user equipment could perform this determining step. This user equipment is then typically the receiving user equipment.

Subsequently, in a third step S12 of the embodiment of a method according to the invention, said first and second user equipment signal or report their respective determined parameter values to the PTT-server and possibly to the other user equipment as well. The PTT-server collects all said determined parameter values and determines on suitable application settings for each user equipment.

It is however implied that the PTT-server might relay reported parameter values from one user equipment to another.

In a fourth step S13, according to the embodiment, the PTT-server provides or signals information regarding the determined suitable application settings to the concerned user equipment. The signaling can be performed by means of any one of SIP/SDP, In-band channel, RTP, RTCP or some specific radio protocol.

The information may comprise raw parameter values or suggested application settings, thereby leaving the adaptation decision to the user equipment.

However, in some other application or embodiment, preferably each user equipment determines its own suitable application settings, based on communicated information about other user equipment from the PTT-server.

For the case of multiple second user equipment it is possible to have a plurality of said multiple second user equipment with high bandwidth links and at least one second user equipment with poor radio environment. The PTT-server can choose to selectively inform the user equipment on how to adapt the application settings.

A first possible adaptation is to force all user equipment to use a robust application setting, whereby all user equipment have to adapt to the application settings of the user equipment with poorest radio environment.

Another possible adaptation is to only inform the user equipment with the poorest quality of any changes to application settings.

Finally, but not preferably, dropping the user equipment with the poorest radio environment.

Finally, in a fifth step S14, said first and second subscriber's user equipment adapts their respective application settings according to the information provided by the PTT-server. The various application parameters can be adapted either in-between two talk spurts or during speech. Examples of the different cases can be performed according to the following, it is however implied that most of the application settings can be adapted during speech.

The number of frames in an IP packet may be adapted in-between two talk spurts, either when the PTT-button is released or during silence periods in the speech, as detected by a Voice Activity Detection algorithm.

Coder mode may be adapted during speech.

Frame buffer depth may be adapted in-between two talk-spurts, similarly to the number of frames.

Other relevant application settings can be adapted in a similar manner, either during speech or in-between two talk spurts.

A general embodiment of a multimedia system according to the invention comprises means for reporting PTT-session parameter values from at least one of first and second user equipment to a PTT-server, means for determining new parameter values for at least one of said user equipment, and means for adapting the application settings of said at least one of said first and second user equipment based on said new parameter values.

Figure 4:
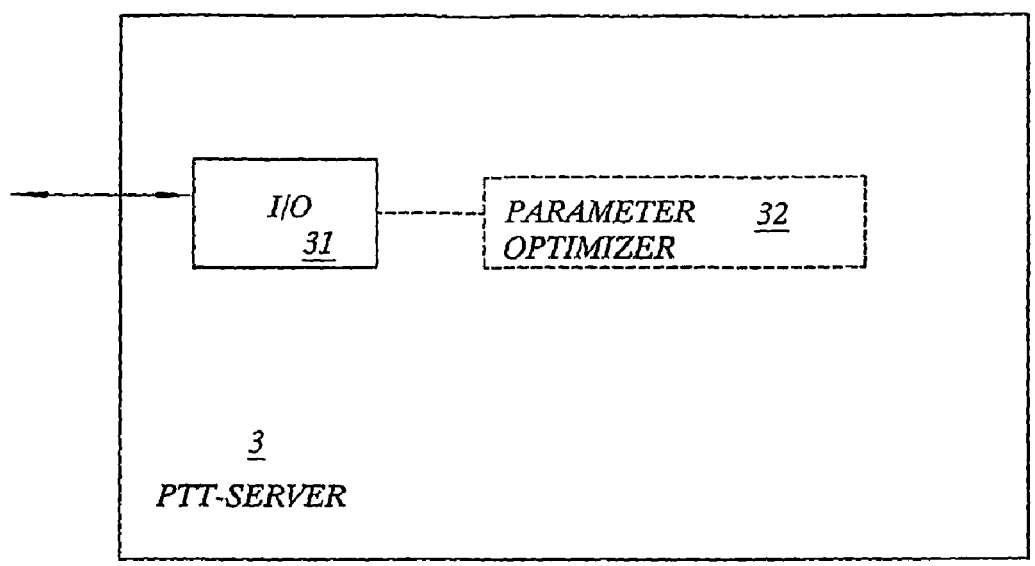
FIG. 4 is a schematic block diagram of an embodiment of a PTT-server according to the invention.

FIG. 4 illustrates a schematic block diagram of an embodiment of a PTT-server 3 according to the invention. The PTT-server 3 comprises first means 31 for receiving reported PTT-session parameter values from said first and second user equipment, and second means 32 for determining or optimizing new PTT parameter values for at least one of said first and second user equipment. Said first means 31 typically comprises an I/O unit 31 for communicating with said first and second user equipment, thereby providing reporting functionality for reporting determined new PTT parameter values.

The second means 32 are optional, since it is possible according to another embodiment, to perform the determination of new PTT-session parameter values at a user equipment. For that case the second means 32 acts as a relay unit, forwarding received reported parameter values for at least one of said first and second user equipment to at least one other of said first and second user equipment.

Figure 5:
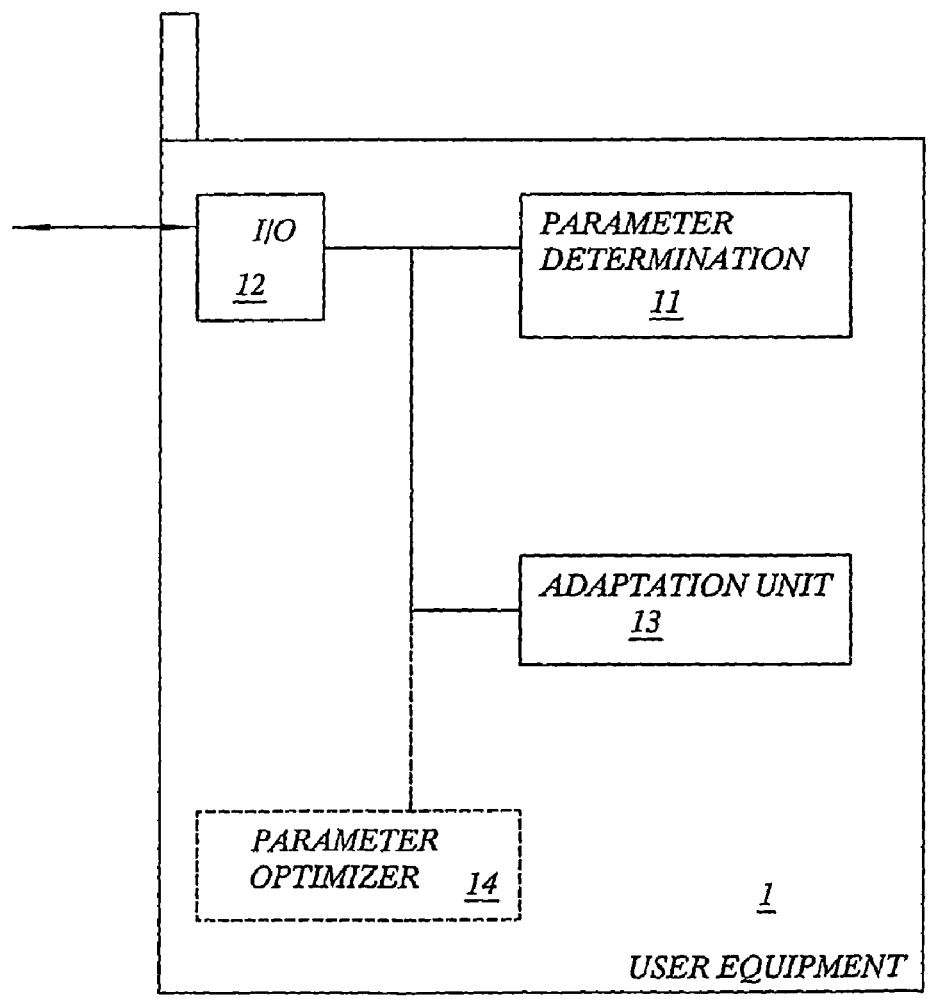
FIG. 5 is a schematic block diagram of an embodiment of a user equipment according to the invention.

FIG. 5 illustrates a schematic block diagram of an embodiment of a user equipment 1 according to the invention. The user equipment 1 comprises an I/O-unit 11 for communicating with the PTT-server and other user equipment, first means 12 for determining PTT session parameter values for PTT application settings, second means 13 for adapting PTT session parameter values and third optional means 14 for determining or optimizing new parameter values or application settings.

Figure 6:
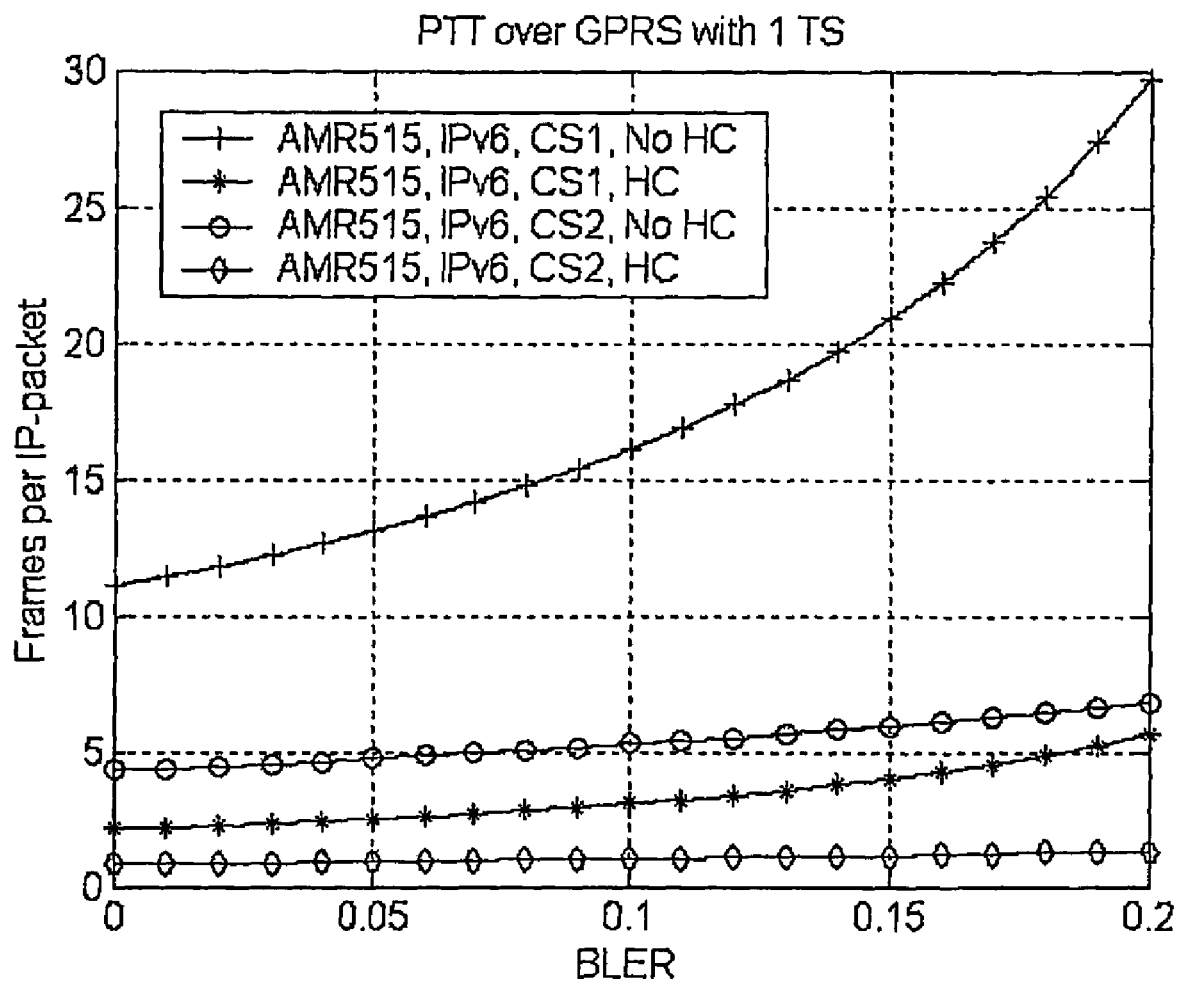
FIG. 6 illustrates the optimal number of frames per IP-packet for GPRS 1 time slot. An average IP/UDP/RTP header size of 3 bytes is assumed for the header compression (HC) case.

The I/O unit 11 provides functionality for reporting determined PTT parameter values to the PTT-server and to receive communicated new parameter values and/or suggested application settings from the PTT-server and/or other user equipment. The adaptation unit 13 adapts the PTT-session parameter values based on the new parameter values reported by the PTT-server and/or An exemplification of a case of adaptation of application settings will be described below, with reference to FIG. 6.

A GPRS bearer suffering from a "bad" radio environment would mean that coding scheme CS1 is used. If we assume a Block Error Rate (BLER) of 10% the available bandwidth of such system becomes: ~7.2 kbit/s.

Further, it is assumed that the AMR speech coder operates at the 5.15 kbit/s coder rate. We also assume that the speech frames are packed in IPv6/UDP/RTP packets and that the AMR payload format is used. In the case of no header compression, 16 speech frames (see FIG. 6) must be packed in one IP-packet, hence creating a packetizing delay of 320 ms. In the case of a good radio environment, coding scheme CS2 might be used. Even with the same BLER (10%) the number of frames in an IP-packet can be reduced to 6 frames, this would give a packetizing delay of 120 ms.

Therefore, if adjustment of this application setting is possible then the packetizing delay can be reduced with 200 ms. Further, the transmission delay at every radio link is also reduced when each IP-packet becomes smaller and thus needs shorter transmission time.

To be able to set an appropriate value of the number of frames per IP-packet a set of relevant parameters must be determined. In the example above, we could have determined the bandwidth of the PTT-channel or the coding scheme that was used and the number of time slots used. Another parameter that is possible to "measure" or determine is if header compression is used. (Further reductions of the number of frames packetized in one IP-packet can be done if header compression is used, see FIG. 6).

The present invention is described in the context of a push to talk service in a multimedia system. However, the same general idea is applicable to any other push-service where information is supplied in the form of IP packets, e.g. text, video, photos etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method in a multimedia system where a first user with user equipment (1) uses a Push to talk service (PTT), provided by a PTT-server (3), to communicate with at least a second user equipment (2) using said Push to talk service (PTT), said method comprising the steps of:
   - at least one of said first (1) and second (2) user equipment reporting at least one PTT session parameter value for its PTT application settings to the PTT server (3);
   - determining new PTT session parameter values for at least one of said first (1) and second (2) user equipment based on said reported at least one PTT session parameter value, comprising the steps of:
     - said PTT-server (3) forwarding said reported at least one PTT session parameter value of said at least one of said first (1) and second (2) user equipment to at least one of said first (1) and second (2) user equipment that does not have said reported at least one PTT session parameter value; and,
     - said at least one of said first (1) and second (2) user equipment determining new PTT session parameter values based on said reported at least one PTT session parameter value and its own parameter values; and,
   - at least one of said first (1) and second (2) user equipment adapting its PTT application settings during operation of said service based on said new PTT session parameter values.

2. The method recited in claim 1, wherein each said first (1) and second (2) user equipment reports its at least one PTT session parameter value to the PTT-server (3).

3. The method recited in claim 1, wherein said determining step comprises the steps of:
   - said PTT-server (3) determining new parameter values for at least one of said first (1) and second (2) user equipment based on said reported parameter values from at least one of said first (1) and second (2) user equipment; and,
   - said PTT-server (3) forwarding said new parameter values or suggested application settings based on said new parameter values to said at least one of said first (1) and second (2) user equipment.

4. The method recited in claim 1, wherein said application settings at the beginning of the conversation comprise parameter values selected from the group consisting of number of frames per IP-packet, coder mode, and frame buffer depth.

5. The method recited in claim 1, wherein said first (1) and second (2) user equipment determine and report one or several PTT session parameter values selected from the group consisting of received bit rate, maximum possible bit rate, coding scheme used, number of time slots used, and header compression used or not.

6. The method recited in claim 1, wherein at least one of said first (1) and second (2) user equipment reports the determined parameter values to said PTT-server (3) and/or to other of said first (1) and second (2) user equipment which do not have said parameter values.

7. The method recited in claim 1, wherein said PTT-server (3) collects the determined parameter values from all of said first (1) and second (2) user equipment and provides information of suitable application settings to all of said first (1) and second (2) subscribers equipment.

8. The method recited in claim 1, wherein said reporting step is performed using at least one of SIP/SDP, In-band channel, RTP, RTCP, specific radio protocol.

9. The method recited in claim 1, wherein said first user equipment communicates with multiple second user equipment (2).

10. The method according to claim 9, wherein when a majority of said multiple second user equipment (2) have high bandwidth links and at least one of said multiple second user equipment (2) has poor radio environment, said PTT-server (3) chooses one of:
    - ordering all said first (1) and second (2) user equipment to use a robust settings, whereby all user equipment (1, 2) have the same application settings as the at least one with the lowest link quality; or
    - performing adjustment to the transmitted data in said PTT-server (3) for the user equipment with the lowest link quality, or dropping the user equipment with the lowest link quality.

11. The method recited in claim 1, further comprising the step of adapting the application settings in-between two talk spurts according to either:
    - when a special button on a user equipment (1, 2) is released or during silence periods in the speech as detected by a voice activity detection algorithm;
    - and/or during speech.

12. The method according to claim 11, further comprising the step of adapting the application settings according to at least one of:
    - number of frames per IP-packet in-between two talk spurts;
    - coder mode during speech;
    - frame buffer depth in-between two talk spurts; and,
    - other relevant parameters in periods where they do not disturb the system quality.

13. The method according to claim 1, further comprising the step of adapting said application settings dynamically.

14. A multimedia system wherein a first user with user equipment (1) uses a Push to talk service (PTT), provided by a PTT-server (3), to communicate with at least a second user equipment (2) using said Push to talk service (PTT), said system comprising:
    - means (11) for reporting PTT session parameter values for at least one of said first (1) and second (2) user equipment PTT application settings to the PTT server (3);
    - means (14, 32) for determining new PTT session parameter values for at least one of said first (1) and second (2) user equipment based on said reported PTT session parameter values, comprising:
      - means for said PTT-server (3) to forward said reported at least one PTT session parameter value of said at least one of said first (1) and second (2) user equipment to at least one of said first (1) and second (2) user equipment that does not have said reported at least one PTT session parameter value; and,
      - means for said at least one of said first (1) and second (2) user equipment to determine new PTT session parameter values based on said reported at least one PTT session parameter value and its own parameter values; and, means (13) for adapting the PTT application settings for at least one of said first (1) and second (2) user equipment during operation of said service based on said new PTT session parameter values.

15. A push to talk server (3) in a multimedia system wherein a first user with user equipment (1) uses a Push to talk service (PTT), provided by the PTT-server, to communicate with at least a second user equipment (2) using said Push to talk service (PTT), said server comprising:

means (31) for receiving PTT session parameter values from at least one of said first (1) and second (2) user equipment for their respective PTT application settings;

means (32) for determining new PTT session parameter values for at least one of said first (1) and second (2) user equipment based on said reported PTT session parameter values, comprising:

means for said PTT-server (3) to forward said reported at least one PTT session parameter value of said at least one of said first (1) and second (2) user equipment to at least one of said first (1) and second (2) user equipment that does not have said reported at least one PTT session parameter value, whereby said at least one of said first (1) and second (2) user equipment can determine new PTT session parameter values based on said reported at least one PTT session parameter value and its own parameter values; and, means (31) for communicating said new PTT parameter values or suggested PTT application settings to at least one of said first (1) and second (2) user equipment.

16. The push to talk server according to claim 15, wherein said communicating means (31) are adapted to relay reported PTT session parameter values from said at least one of said first (1) and second (2) user equipment to other of said first (1) and second (2) user equipment.

17. A user equipment (1) adapted for communicating with at least a second user equipment (2) in a multimedia system using a Push to talk service (PTT), provided by a PTT-server (3), said user equipment comprising:

means (11) for determining PTT session parameter values for PTT application settings;

means for reporting at least one PTT session parameter value to the PTT server (3);

means (12) for receiving PTT session parameter values from the PTT-server (3); said received PTT session parameter values being determined as a function of PTT session parameter values reported by said at least a second user equipment (2);

means (14) for determining new PTT-session parameter values based on said received and said determined PTT session parameter values; and, means (13) for adapting the PTT application settings based on the determined new parameter values.

18. A user equipment (1) adapted for communicating with at least a second user equipment (2) in a multimedia system using a Push to talk service (PTT), provided by a PTT-server (3), said user equipment comprising:

means (11) for determining PTT session parameter values for PTT application settings;

means (12) for reporting PTT session parameter values to the PTT-server (3) and for receiving new PTT session parameter values and/or suggested application settings from the PTT-server, said new PTT session parameter values and/or said suggested application settings determined as a function of PTT session parameter values reported by said second user equipment (2); and, means (13) for adapting the PTT application settings based on the received new PTT session parameter values and/ or suggested application settings.

\* \* \* \* \*

UNITED STATES PATENT AND TRADEMARK OFFICE
CERTIFICATE OF CORRECTION

PATENT NO. : 7,428,422 B2
APPLICATION NO. : 10/545278
DATED : September 23, 2008
INVENTOR(S) : Hannu et al.

It is certified that error appears in the above-identified patent and that said Letters Patent is hereby corrected as shown below:

On the Title Pg Item (57), under "ABSTRACT", Line 11, delete "prevented" and insert -- prevented. --, therefor.

In Column 5, Line 9, delete "push-to-talc" and insert -- push-to-talk --, therefor.

In Column 8, Line 36, after "and/or", insert -- other user equipment --.

Signed and Sealed this

Sixteenth Day of February, 2010

David J. Kappos
*Director of the United States Patent and Trademark Office*